United States Patent [19]

Hwang

[11] Patent Number: 4,984,105
[45] Date of Patent: Jan. 8, 1991

[54] CASSETTE LOADING DEVICE FOR FRONT LOADING VCR WHICH UTILIZES THE DRIVING FORCE OF A CAPSTAN MOTOR

[75] Inventor: Hak S. Hwang, Seoul, Rep. of Korea

[73] Assignee: Goldstar Co., Ltd., Seoul, Rep. of Korea

[21] Appl. No.: 268,847

[22] Filed: Nov. 9, 1988

[30] Foreign Application Priority Data

Nov. 10, 1987 [KR] Rep. of Korea ............... 19449/1987

[51] Int. Cl.$^5$ .......................................... G11B 5/027
[52] U.S. Cl. ........................................ 360/85; 360/95
[58] Field of Search ................................. 360/84–85, 360/95

[56] References Cited

U.S. PATENT DOCUMENTS

| | | | |
|---|---|---|---|
| 4,661,864 | 4/1987 | Kuwajima | 360/85 |
| 4,685,008 | 8/1987 | Ohyama | 360/95 X |
| 4,884,153 | 11/1989 | Ahn | 360/85 |

Primary Examiner—John H. Wolff

[57] ABSTRACT

A cassette loading device for a VCR which is designed to load and eject a cassette by making common use of the driving force of a capstan motor. The cassette loading or ejecting operation by the driving force of the capstan motor is conducted by a driving force conversion unit comprising an operational plate swingably disposed between the capstan motor and a cassette loading unit, an intermediate gear rotatably mounted at the lower portion of the operational plate and forced with a pulley interconnected to the capstan motor, two idler gears rotatably mounted through intermediary of coil springs, and first and second washers, respectively, and are adapted to selectively mesh with a loading gear of the cassette loading unit according to the rotational direction of the intermediate gear, and a stopper pin selectively inserted into the circular opening or the extended straight opening of the operational plate.

1 Claim, 4 Drawing Sheets

CASSETTE LOADING DEVICE FOR FRONT LOADING VCR WHICH UTILIZES THE DRIVING FORCE OF A CAPSTAN MOTOR

BACKGROUND OF THE INVENTION

The present invention relates to a cassette loading device for a video cassette tape recorder (hereinafter, referred to as a VCR), and more particularly to a cassette loading device which is designed to load and unload a tape cassette by making use of the driving force of a capstan motor in a front loading type VCR.

In a conventional VCR, a motor for use in loading a cassette is required to transport the cassette to a specified loaded position for reproduction and recording, and a capstan motor is additionally provided to make a tape running by activating a capstan shaft, a supply reel and a take-up reel. Accordingly, there are some disadvantages in that the two separate motors are required to activate the cassette and the tape, respectively, thus giving rise to a complicated structure of a VCR which impairs reduction in size and cost.

SUMMARY OF THE INVENTION

It is therefore an object of the present invention to obviate the above problems of the prior art apparatus.

Another object of the present invention is to provide a cassette loading device which can drive the tape and load the cassette by making common use of an existing capstan motor as a driving source, thereby reducing the cost of the product, The above objects of the present invention are accomplished by providing a driving force conversion unit between a capstan motor and a cassette loading unit which is designed to connect the driving force of the capstan motor to the cassette loading unit in case of loading or ejecting of a cassette and to disconnect the driving force of the capstan motor from the cassette loading unit when the cassette loading operation is completed, so that the capstan motor can be operated to perform its own function such as the tape running operation for various modes The driving force conversion unit comprises an operational plate disposed between the capstan motor and a cassette loading unit and provided with a circular opening and an extended straight opening at one end thereof and two diagonal extensions at the other end thereof, an intermediate gear rotatably mounted at the lower portion of the operational plate by means of a fixing shaft and integrally formed with a pulley which is interconnected with a belt to a pulley fixed below to the capstan motor, two idler gears which are rotatably mounted through intermediary of compression coil springs, first, flat washers and second, flat washers, respectively, on axial pins fixed below to the extensions of the operational plate and are adapted to selectively mesh with a loading gear formed with a worm of the cassette loading unit according to the rotational direction of the intermediate gear and pulley, and a stopper pin which is inserted into the circular opening or the extended straight opening of the operational plate to make possible the cassette loading or ejecting operation or the accomplishment of the own function of the capstan motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become more apparent from the following detailed description in conjunction with the accompanying drawings, which are given by way of illustration only, and thus are not limitative of the present invention, and in which:

FIGS. 5A to 5C are plan views showing the operations of the driving force conversion unit, in which FIG. 5A is a plan view showing a state that the cassette is loaded, FIG. 5B is a plan view showing a state that the cassette is ejected, and FIG. 5C is a plan view showing a state that the driving force of the capstan motor is being transmitted to the speed change drive unit and is not being transmitted to the driving force conversion unit.

DETAILED DESCRIPTION OF THE INVENTION

Figure 1:
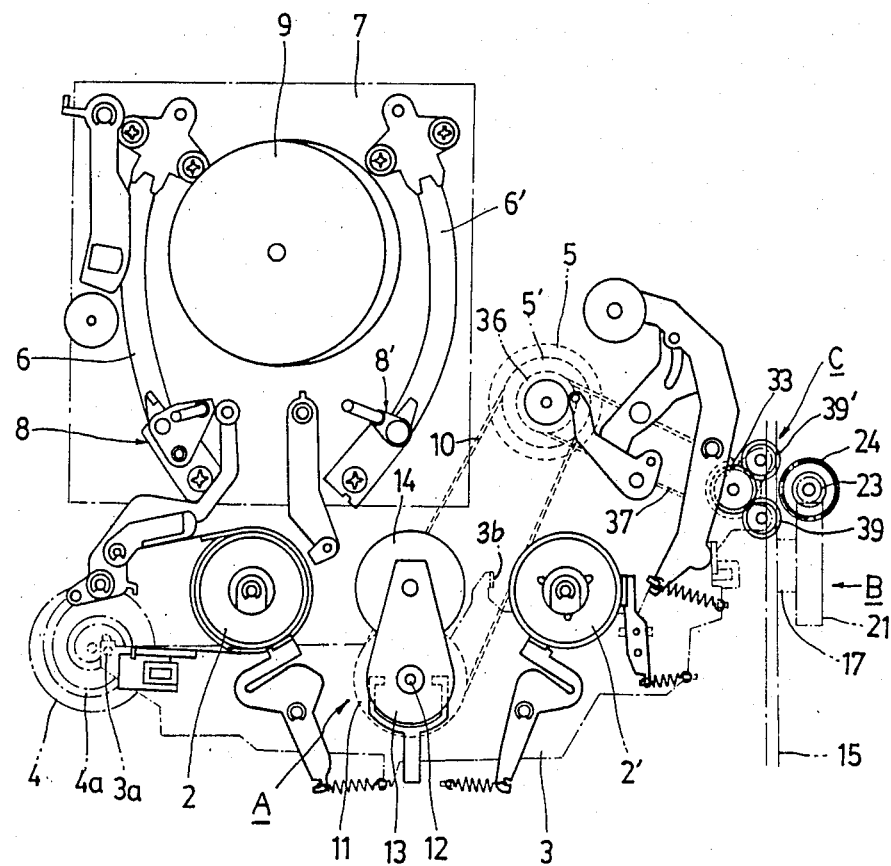
FIG. 1 is a schematic plan view showing a deck mechanism of a VCR to which the cassette loading device of the present invention is pertained.

Referring to FIG. 1, wherein, on the front of a main chassis 1, a supply reel 2 and a take-up reel 2' are disposed, respectively, and between the supply reel 2 and the take-up reel 2' a speed change drive unit A is mounted to selectively transmit the driving force of a capstan motor 5 thereto. On the bottom of the main chassis 1, a function plate 3 having a connecting pin 3a at one end thereof and a cam gear 4 having a spiral cam groove 4a on one surface thereof are installed. The function plate 3 and the cam gear 4 are interlocked with each other by the connecting pin 3a which is inserted into the cam groove 4a so that the function plate 3 can be moved in the left and right when the cam gear 4 rotates. The capstan motor 5 is also installed on the bottom of the main chassis 1, and a loading plate 7 having a pair of arcuate guide apertures 6, 6' through which a pair of slant post assemblies 8, 8' are inserted, is mounted on the center of the main chassis 1.

At the center of said loading plate 7, a rotary head drum 9 is rotatably mounted. On one side of the main chassis 1, a cassette loading unit B is installed, and between the capstan motor 5 and the cassette loading unit B, a driving force conversion unit C is also disposed.

The driving force of the capstan motor 5 is transmitted to a driving force conversion unit C to load or eject a cassette by driving the cassette loading unit B, or is transmitted to the speed change drive unit A to rotate the supply reel 2 or the take-up reel 2'.

The speed change drive unit A is composed of a clutch (not shown) for maintaining the driving force of the capstan motor 5 transmitted by a driving pulley 11 which is connected to a pulley 5' of the capstan motor 5 with a belt 10 in a constant torque, and an idler gear 14 which is rotatably mounted to a swing lever 13 fixed on a shaft 12.

Figure 2:
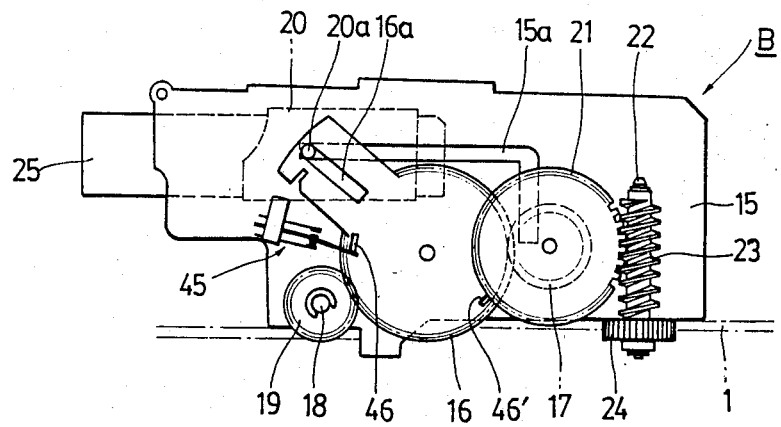
FIG. 2 is a side view showing the cassette loading device of FIG. 1.

Referring now to FIG. 2, wherein the reference numeral 15 represents a side wall plate having a right-angled guide aperture 15a is mounted uprightly to the main chassis 1, and under the guide aperture 15a an arm gear 16 having an extended guide groove 16a is rotatably mounted. The arm gear 16 is engaged with a connecting gear 17 which is coaxially mounted with a worm gear 21. On the opponent side of the side wall plate 15, another side plate (not shown) is also mounted in parallel, and is provided with all the parts as the shown side plate 15.

The two plates 15 are interconnected to each other with a connecting bar 18 having a pair of drive gears 19 (only one is shown) at the outer ends thereof. The drive gears 19 mesh with the arm gears 16 each other. Between the side plates 15, a cassette holder 20 including a pair of guide pins 20a is positioned, and said guide pins 20a are inserted into the guide grooves 16a of the arm gears 16 through the guide apertures 15a of the side plates 15, respectively. On the shown side plate 15, a worm gear 21 is rotatably mounted coaxially with the connecting gear 17, and a worm 23 meshing with the worm gear 21 is rotatably mounted to a shaft 22 fixed to the main chassis 1, and at the lower portion of the worm 23, a loading gear 24 is integrally formed therewith which is adapted to transmit the driving force of the capstan motor 5 to the cassette loading unit B via the driving force conversion unit C.

The cassette loading unit B as described herein above is brought into operation as follows.

As shown in FIG. 2, the worm 23 is rotated in accordance with the driving force of the capstan motor 5 in a state that a cassette 25 is inserted into a cassette holder 20, the worm gear 21, the connecting gear 17 and the arm gear 16 meshing with said connecting gear 17 are consecutively rotated by means of the driving force of the capstan motor 5, and accordingly the cassette holder 20 is transported from its initial position as shown in FIG. 2 to a loaded position. As a result, the cassette 25 inserted into the cassette holder 20 is loaded on the supply reel 2 and take-up reel 2'.

Figure 3:
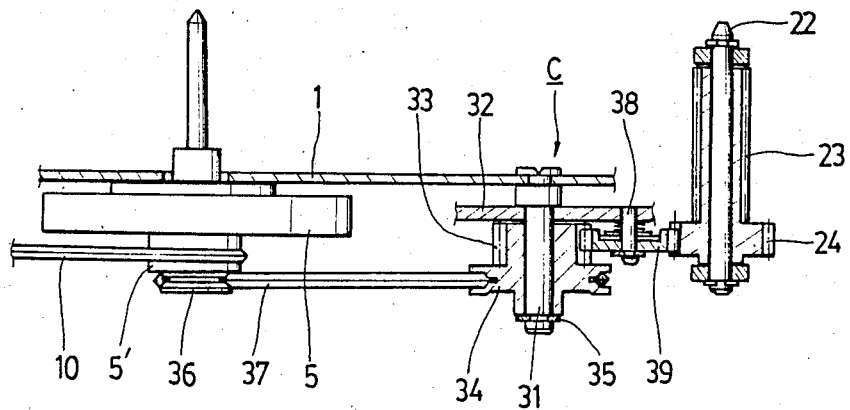
FIG. 3 is a longitudinal sectional view showing a driving force conversion unit according to the present invention.
Figure 4:
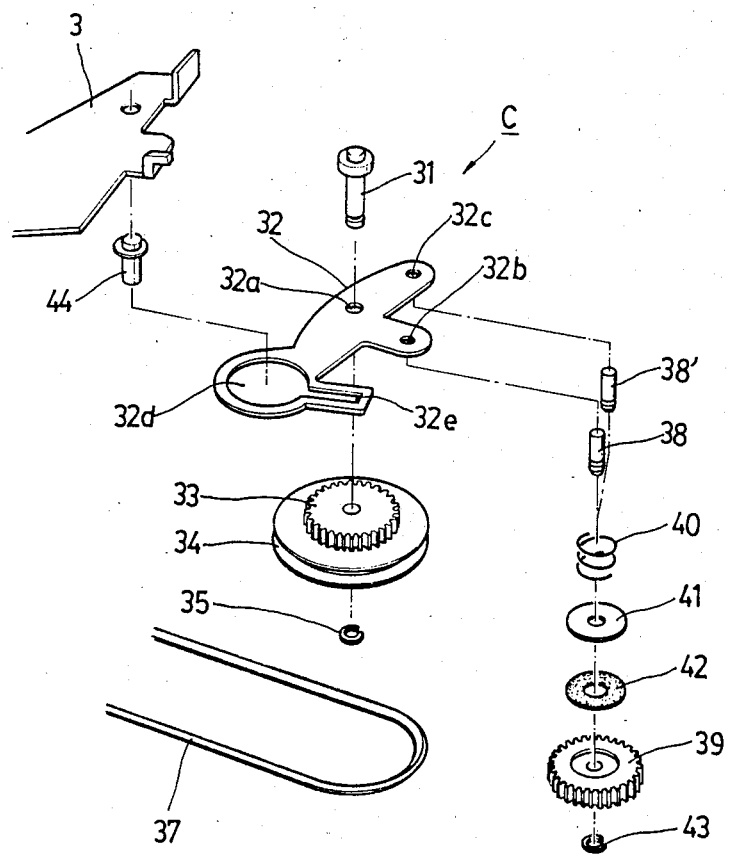
FIG. 4 is an exploded perspective view of the driving force conversion unit.

Referring now to FIG. 3 and FIG. 4 showing the driving force conversion unit C for selectively transmitting the driving force of the capstan motor 5 to the cassette loading unit B. As shown in the drawings, to a fixing shaft 31 fixed downward to the main chassis 1, an operational plate 32 is rotatably mounted through a hole 32a and a pulley 34 integrally formed with an intermediate gear 33 is rotatably mounted and secured thereto by a stopper ring 35. The pulley 34 is interconnected with a belt 37 wound on a pulley 5' fixed to the lower portion of the capstan motor 5. The operational plate 32 is provided at one end thereof with two extensions having respective holes 32b, 32c at the free ends thereof, and a pair of axial pins 38, 38' are fixed downward to the extensions through the holes 32b, 32c, respectively. To the axial pins 38, 38', a pair of idler gears 39, 39' each for meshing selectively with the loading gear 24 of the worm are rotatably mounted and secured by stopper rings 43 (only one is shown), and between the upper surfaces of the idler gears 39, 39' and the lower surface of the operational plate 32, compression coil springs 40, first flat washers 41 and second circular flat washers 42 (only one is shown) are consecutively intermediated.

And, at the other end of the operational plate 32, a circular opening 32d and an extended straight opening 32e communicating each other through which a stopper pin 44 fixed at one end of the function plate 3 is inserted, are provided. In FIG. 1, the reference numeral 3b shows a stopper projection for preventing the idler gear 14 of the speed conversion drive unit A from contacting with the take-up reel 2' when the cassette loading unit B is activated to load or unload the cassette 25.

In FIG. 2, the reference numeral 45 represents a switch operative projections for bring the switch 45 into operation, respectively.

The operations of the loading device of the present invention will now be described in detail.

As shown in FIG. 2, when the cassette 25 is pushed in a state that the cassette 25 is inserted in the cassette holder 20, the guide pin 20a of the cassette holder 20 pushes the arm of the arm gear 16 and accordingly the switch 45 is turned ON. According to the signal of the switch 45, the capstan motor 5 is actuated and the driving force thereof is transmitted to the pulley 11 of the speed change drive unit A and the pulley 34 of the driving force conversion unit C via the belts 10, 37 wound on the pulleys 5', 36. The driving force transmitted to the pulley 11 of the speed change drive unit A swings the idler gear 14 which is rotating in the counterclockwise direction (on the basis of FIG. 1) toward the take-up reel 2'. However, at this moment, the swinging movement of the idler lever 14 is restricted by the stopper projection 3b of the function plate 3, so that the driving force is not transmitted to the take-up reel 2'.

Figure 5A:
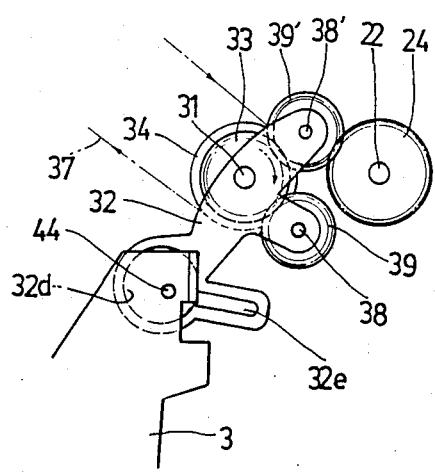

Furthermore, according to the driving force transmitted to the pulley 34 of the driving force conversion unit C, the intermediate gear 34 is rotated in the clockwise direction, (on the basis of FIG. 5A), and at this moment, since the intermediate gear 33 is in mesh with the idler gears 39, 39' the operational plate 32 swings in the clockwise direction due to the friction resistance by the compression coil springs 40 and the second washes 42 between the lower surface of the operational plate 32 and the upper surfaces of the idler gears 39, 39'. As a result, the idler gear 39' meshes with the loading gear 24 and the other idler gear 39 is separated therefrom, as shown in FIG. 5A. Thus, the driving force is transmitted to the arm gear 16 through the worm 23, the worm gear 21 and the connecting gear 17, and accordingly the cassette 25 is loaded.

Figure 5B:
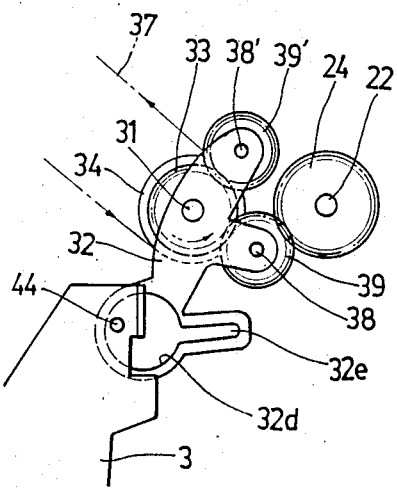

On the other hand, at the time of ejecting the cassette 25, the capstan motor 5 rotates in the counterclockwise direction (on the basis of FIG. 1), the pulley 34 and the intermediate gear 33 are rotated in the counterclockwise direction, thereby swinging the operational plate 32 in the counterclockwise direction (on the basis of FIG. 5B). At this moment, the idler gear 39' is separated from the loading gear 24 and then the idler gear 39 is to be meshed with the loading gear 24, as shown in FIG. 5B. At this moment, the loading gear 24 and the worm 23 are rotated in the counterclockwise direction according to the rotation of the loading gear 39, thereby the cassette holder 20 and the cassette 25 are ejected from their loaded position on the contrary to the above described loading order.

Figure 5C:
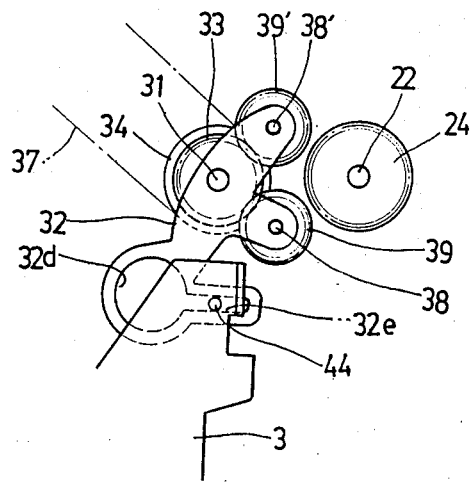

In case of the cassette loading or ejecting operation as described above, because the stopper pin 44 of the function plate 3 is positioned within the circular opening 32d of the operational plate 32 the swinging movement of the operational plate 32 is not to be restricted Furthermore, in case where the various modes such as PLAY, CUE, REV, FF and REW modes are conducted, the cam gear 4 as shown in FIG. 1 is actuated by a separate drive source so that the function plate 3 is moved to the right as shown in FIG. 5C, thereby the stopper pin 44 of the function plate 3 is inserted into the extended straight opening 32e of the operational plate 32, as a result both the idler gears 39, 39' are separated from the loading gear 24 and at the same time, the operational plate 32 can not be swung.

Accordingly, in the state that the idler gears 39, 39' are separated from the loading gear 24, if the capstan motor 5 is rotated, the idler gears 39, 39' run idle, so that the driving force of the capstan motor 5 is not transmitted to the cassette loading unit B.

In this state, the driving force of the capstan motor 5 is transmitted to the speed change drive unit A via the belt 10, and the idler gear 14 of the speed change drive unit A rotates in the clockwise or counterclockwise direction to rotate the supply reel 2 or the take-up reel 2'.

At this moment, since the function plate 3 is moved to the right and the stopper projection 3b is not within the reach of the idler 14, the idler 14 can be swung toward the take-up reel 2' not by being encountered any restrictions.

As described above, the cassette loading device of the present invention is very advantageous in reducing the cost since the cassette loading and unloading operations are performed by making use of the driving force of the existing capstan motor and not by using an additional motor The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cassette loading device for a VCR, which comprises:
    a capstan motor for driving a supply reel and a take-up reel;
    a speed change drive unit for selectively rotating the supply reel or the take-up reel;
    a cassette loading unit for loading or ejecting a cassette;
    a function plate interlocked with a cam gear; and
    a driving force conversion unit comprising an operational plate which is rotatably mounted on a fixing shaft disposed between the capstan motor and a worm screw of the cassette loading unit and the operational plate is provided with a circular opening and an extended straight opening at one end of the operational plate and diagonal extensions at the other end thereof, an intermediate gear rotatably mounted at the lower portion of the fixing shaft and integrally formed with a pulley which is interconnected with a belt to a pulley fixed to the capstan motor, idler gears which are rotatably mounted through intermediary of compression coil springs, first flat washers and second flat washers, respectively on axial pins fixed below to the extensions of the operational plate and are adapted to selectively mesh with a loading gear formed with said worm screw of the cassette loading unit, and a stopper pin which is inserted into either the circular opening or the extended straight opening of the operational plate, selectively.

* * * * *